United States Patent [19]  
Sasaki et al.

[11] Patent Number: 4,907,190  
[45] Date of Patent: Mar. 6, 1990

[54] COMPUTER CONTROL SYSTEM AND METHOD FOR EFFECTING SEQUENCE CONTROLS AND SERVO-CONTROLS

[75] Inventors: Yoshinari Sasaki; Etsuji Oda; Naoki Kurita; Toshihiko Kaneko, all of Numazu, Japan

[73] Assignee: Toshiba Kikai Kabushiki Kaisha, Tokyo, Japan

[21] Appl. No.: 894,918

[22] Filed: Aug. 8, 1986

[51] Int. Cl.⁴ .............................................. G06F 9/22
[52] U.S. Cl. ................... 364/900; 364/926.93; 364/946.5; 364/946.6; 364/946.7; 364/948.3; 364/949

[58] Field of Search ............... 364/200 MS File, 300, 364/900 MS File

[56] References Cited

U.S. PATENT DOCUMENTS

| | | | |
|---|---|---|---|
| 3,970,999 | 7/1976 | Elward | 364/200 |
| 4,016,545 | 4/1977 | Lipovski | 364/900 |
| 4,067,058 | 1/1978 | Brandstaetter et al. | 364/200 |
| 4,118,776 | 10/1978 | Isomura | 364/474 |
| 4,136,400 | 1/1979 | Caswell et al. | 364/900 |
| 4,229,790 | 10/1980 | Gilliland et al. | 364/200 |
| 4,348,721 | 9/1982 | Brereton et al. | 364/200 |
| 4,403,283 | 9/1983 | Myntti et al. | 364/200 |
| 4,425,616 | 1/1984 | Woodell | 364/200 |
| 4,683,549 | 7/1987 | Takaki | 364/900 |

Primary Examiner—Thomas M. Heckler  
Assistant Examiner—Christina M. Eakman  
Attorney, Agent, or Firm—Cushman, Darby & Cushman

[57] ABSTRACT

In a computer system suitable for effecting a sequence control and a servo-control, programs are prepared by using three types of parallel processing instructions consisting of an open instruction, a close instruction is issued from a first program for parallelly processing a second program. The close instruction is issued from the first program to terminate the first or second program. The pause instruction is issued from the first program to stop execution of the first program for a definite interval.

16 Claims, 4 Drawing Sheets

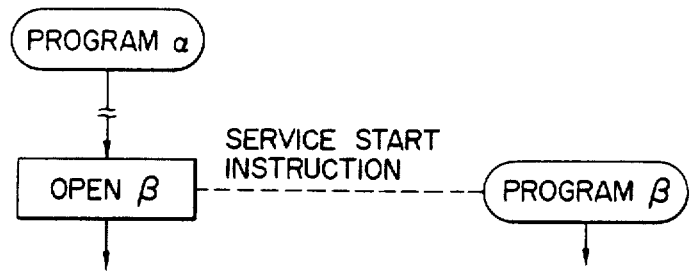
F I G. 1
F I G. 2
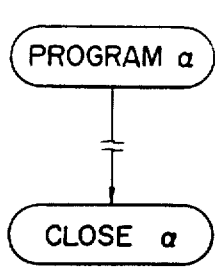
F I G. 3
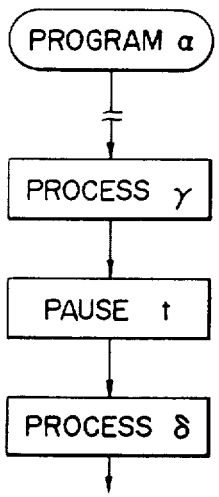
F I G. 4

COMPUTER CONTROL SYSTEM AND METHOD FOR EFFECTING SEQUENCE CONTROLS AND SERVO-CONTROLS

BACKGROUND OF THE INVENTION

This invention relates to a computer system suitable for effecting a sequence control and a servo-control.

In the prior art, a sequence control and a servo-control have been effected by a programmable controller (PC) or a computerized numerical controller (CNC). However, these control systems involve certain problems at the time of programming. For example, in the case of the PC, since programs are prepared with ladder circuits, there is a large defect that the programs cannot be prepared in the same manner as in a general purpose computer. More particularly, when a program is prepared using ladder circuits, it is difficult to prepare a program for a circuit such as a sequence circuit wherein the result differs depending upon the past or preceding state of the circuit. Even if such a program could be prepared, preparation of such a complicated program is much more difficult. In addition, assisting means for preparing a program that is used as a means for automatically preparing a portion of the program and programming technique is much inferior to that of the high grade general purpose computer so that such means and technique used in the general purpose computer cannot be used for the PC.

Since the control speed of the PC is limited by the cycle time thereof, a high response speed of less than several milliseconds cannot be obtained. Moreover, as the number of input/output ports of the PC is also limited, in many cases inputting and outputting of numerical data become impossible. Furthermore, with the PC it is difficult to judge conditions including an arithmetic computation. As a result, it has been difficult to directly control a sequence system and a servo-system by using a PC.

In the case of a CNC, since it utilizes a computer, not only the hardware but also the software of the system become complicated. For this reason, it is difficult to prepare a program or modify a sequence for a mechanical engineer or a field engineer not skilled in software. For the purpose of obviating the difficulty caused by using system words, although a system utilizing macro-instruction sets which are exclusively used for sequence controls has been proposed, prior art macro-instruction sets are interpreters so that there are such problems that the execution speed of the sequence is low and that the performance is limited.

SUMMARY OF THE INVENTION

Accordingly, it is an object of this invention to provide a novel computer control method and system capable of effecting a sequence control or a servo-control with such languages as BASIC and FORTRAN rather than conventional system languages.

Another object of this invention is to provide a novel computer control method and system capable of decreasing the number of flags, timers, etc., thus simplifying the programs.

According to this invention, there is provided a processing method utilizing first and second programs for effecting a sequence control and a servo-control, comprising the steps of issuing an open instruction from the first program for starting a parallel processing of the second program; and issuing from the first program a close instruction that terminates the first or second program and for issuing a pause instruction which stops execution of the first program for a definite interval, the open instruction, the close instruction and the pause instruction being used as parallel processing instructions.

According to one embodiment of this invention, there is provided a computer system for executing three types of parallel processing instructions consisting of an open instruction, a close instruction and a pause instruction, comprising: a central processing unit (CPU); a timer comprising a counter renewed by a definite count at each predetermined time and connected to the CPU to be read thereby; program memory means for storing programs of a sequence control and a servo-control to be executed by the CPU; a program counter connected to the CPU and the program memory means for designating an address of the program memory means, the address storing an instruction to be executed next, a content of the program counter being renewed according to a type of an instruction executed by the CPU; an address table connected to the CPU and the program counter for registering addresses of programs designated by an open instruction and a pause instruction, registered addresses of the address table being searched and erased in accordance with a close instruction; a time table connected to the CPU and written with a predetermined time for starting an execution of a program registered in the address table; and a pointer connected between the address table and the time table and to the CPU for scanning corresponding portions of the address table and the time table.

According to a modified embodiment of this invention there is provided a computer system suitable for effecting a sequence control and a servo-control, comprising: a central processing unit (CPU); an interruption clock which applies an interruption signal to the CPU at a predetermined interval; program memory means for storing programs of a sequence control and a servo-control to be executed by the CPU; a program counter connected to the CPU and the program memory means for designating an address of the program memory means, the address storing an instruction to be executed next, a content of the program counter being renewed according to the type of an instruction executed by the CPU; a plurality of service circuits each including an address table, a service pointer, a top pointer and a catalogue pointer; and a pause pointer controlled by the CPU for selecting one of the service circuits having the shortest pause time at an initial state, the address table being connected to the program counter for registering addresses of programs designated by an open instruction and a pause instruction, wherein registered addresses of the address table are searched and erased in accordance with a close instruction, the service pointer designates the position of the address table storing an address of a program now being served, the top pointer denotes a leading address of a program to be served and stored in the address table, and the catalogue pointer denotes the position of the address table written by an open instruction.

BRIEF DESCRIPTION OF THE DRAWINGS

In the accompanying drawings:

FIG. 1 is a flow chart showing the operation of an open instruction;

FIGS. 2 and 3 are flow charts for explaining the operation of a close instruction;

FIG. 4 is a flow chart for explaining the operation of a pause instruction;

DESCRIPTION OF THE PREFERRED EMBODIMENTS

Figure 5:
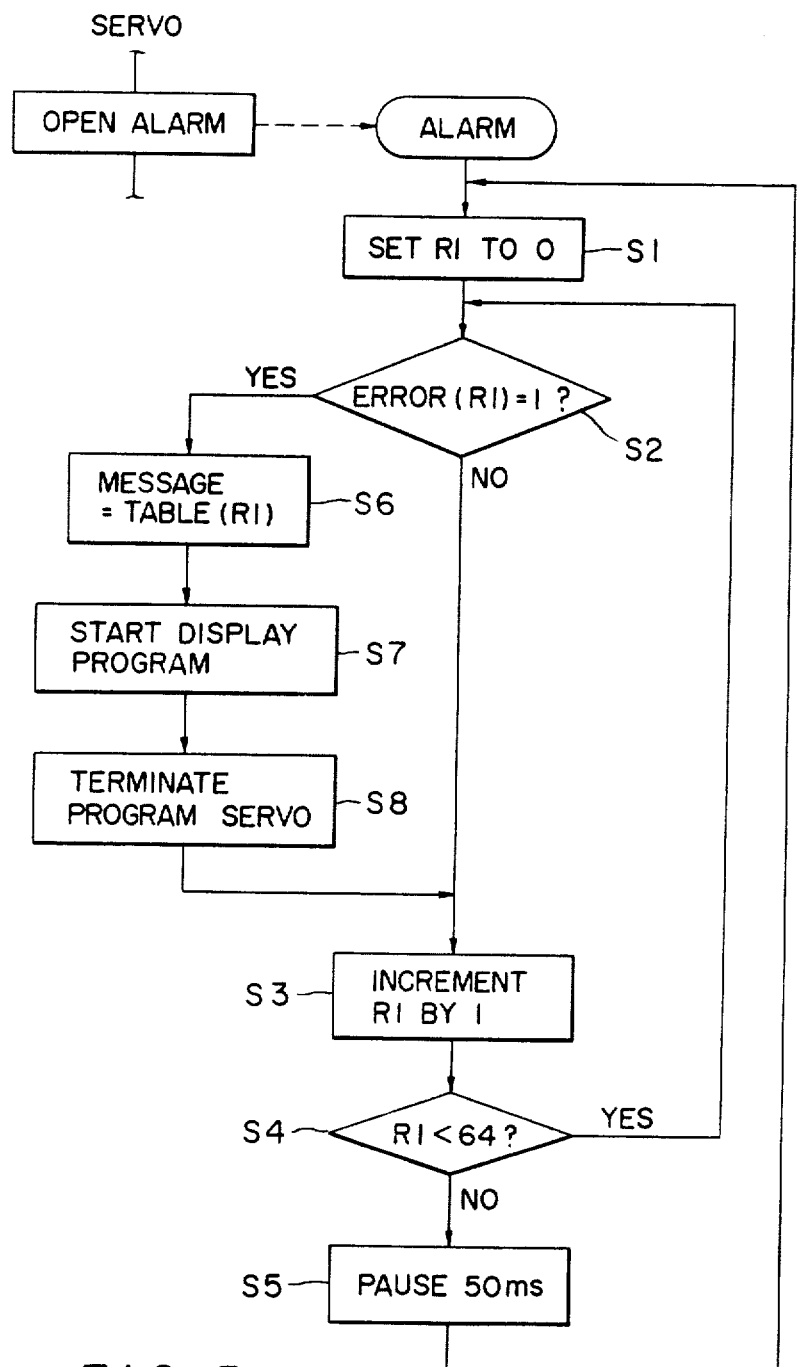
FIGS. 5 and 6 are flow charts showing examples of servo-control programs utilizing an open instruction, a close instruction and a pause instruction, respectively.

In this invention, system languages are not used as programming languages for sequence controls and servo-controls, for such languages as BASIC and FORTRAN that can readily be used by persons not skilled in software techniques of computer systems are used. It should be understood that, if necessary, system languages can also be used.

When such programming languages are used, since the operation speed of a mechanical device is slower than that of a computer, when preparing such a program there arises a problem. More particularly, since there are many waiting times in a program, during the waiting times the computer is obliged to execute loops so that the computer becomes idle. To accurately determine the waiting time, however, it is necessary to use many flags and timers, thus complicating the program.

A program utilizing parallel processing to solve this problem can be prepared with system languages, but languages such as BASIC and FORTRAN cannot be used. This invention can solve this problem by using three types of parallel processing instructions comprising an open instruction, a close instruction and a pause instruction.

The operation of an open instruction "OPEN $\beta$" is shown by a flow chart in FIG. 1. The open instruction OPEN $\beta$ starts an execution of a program $\beta$ different from a program $\alpha$ now being executed. After executing this instruction, programs $\alpha$ and $\beta$ are simultaneously executed in parallel. Although in the sequence control, a number of sequences are executed in parallel at the same time and in such a case the parallel processings are executed by using the open instruction.

The operation of the close instruction "CLOSE $\beta$" is shown in FIGS. 2 and 3. The close instruction forcibly terminates program $\beta$ now being executed in parallel with program $\alpha$. Execution of program $\beta$ forcibly terminates using an instruction now being executed when the close instruction has been executed. Where there are a plurality of tasks executed by the same program, for example, where a plurality of programs $\beta$ are processed in parallel, executions of all programs are forcibly terminated. Where the close instruction CLOSE $\beta$ is used, supervision of completions of processings and the terminations of processings can be made by a program exclusively used for this purpose. The close instruction CLOSE $\alpha$ can also be used for terminating program $\alpha$.

The operation of the pause instruction "PAUSE t" is shown in FIG. 4. Upon execution of this instruction, the execution of the program $\alpha$ is interrupted for an interval (on the order of milliseconds) determined by this parameter, and the following processing is resumed. Assuming that the parameter t is "35", after executing processing $\gamma$ the execution of the program $\alpha$ is interrupted for 35 milliseconds (ms), and then the execution of the program $\alpha$ is resumed, thus executing a processing $\delta$. During the execution of the pause instruction PAUSE t, executions of the other programs are continued without being interrupted. By using the pause instruction PAUSE t, a time necessary for waiting for the completion of mechanical operations and input/output can be provided without providing a special timer. Since the pause in a single program of a plurality of programs in parallel is different from a case in which a processing is caused to wait by using a loop, it is not necessary to cause the processings of other sequences to wait during interruption.

A method of effecting a sequence control and a servo-control by using three parallel processing instructions including an open instruction, a close instruction and a pause instruction described above, will be described with reference to a flow chart shown in FIG. 5.

A subprogram ALARM shown in the flow chart normally supervises an error flag in a program SERVO for producing a message when an error occurs in the program. In the program SERVO, when an error occurs, the value of an element in an arrangement ERROR is set to "1" depending upon the type of the error. Error messages to be displayed for respective elements in an arrangement ERROR are prestored in corresponding elements in an arrangement TABLE. A subprogram ALARM is started by using an open instruction OPEN ALARM in the main program and executed in parallel with the program SERVO. Upon starting, at step S1, a variable R1 is set to "0". After that, at step S2, a judgement is made as to whether an element ERROR (R1) in arrangement ERROR has been set to "1" or not. When the result of judgement is NO, at step S3 the variable R1 is incremented by 1 for the purpose of checking the next element in arrangement ERROR for repeating the same operation. At Step S4 a judgment is made as to how many elements in arrangement ERROR have been checked. When all elements of 64 arrangements ERROR are not "1", meaning that no error was found, after awaiting for 50 ms at step S5 in accordance with a pause instruction PAUSE 50, the same processings are repeated.

At step S2, when it is judged that ERROR (R1) has been set to "1", at step S6 a message in an arrangement TABLE corresponding to an element which has been changed to "1" in arrangement ERROR is substituted for a variable MESSAGE in accordance with an instruction MESSAGE = TABLE (R1). Then at step S7, a display program is started by an open instruction OPEN DISPLAY for displaying a message stored in an arrangement VARIABLE. A program SERVO in which an error has occurred is terminated at step S8 by a close instruction CLOSE SERVO. By using parallel processing programs comprising an open instruction, a close instruction and a pause instruction, an error check at an interval of 50 ms, an error display and termination of a program in which an error has occurred can be made independently of the program SERVO.

Figure 6:
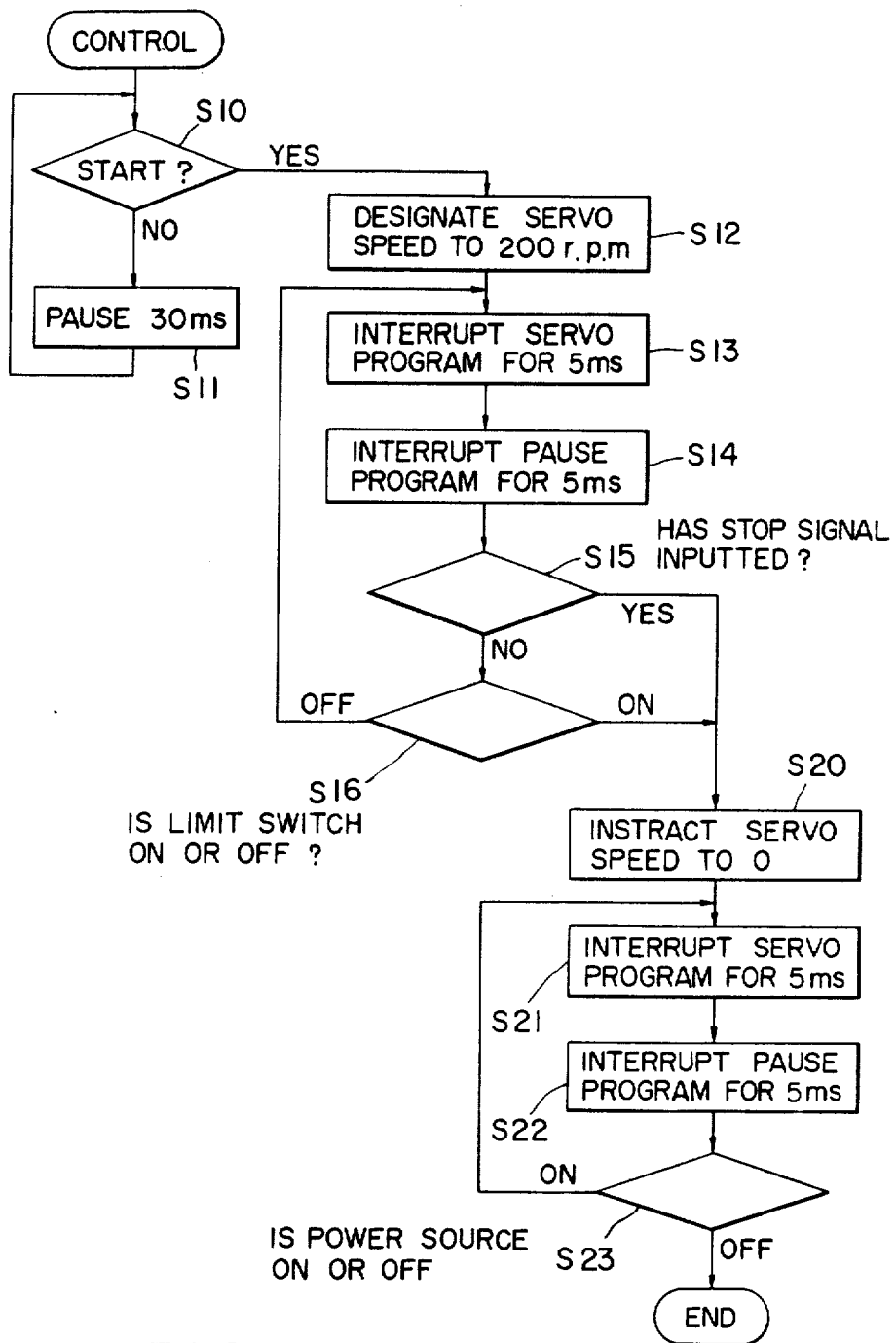

An example of a program for controlling a servo-system and sequence system will now be described with reference to a flow chart shown in FIG. 6.

In the program, at steps S10 and S11 a start signal is constantly checked at an interval of 30 ms. When a start signal is detected at step S10, at step S12 the speed of the servo-system is designated to 200 r.p.m. At steps S13 and S14 the servo-program is opened every 5 ms. At steps S15 and S16, judgements are made as to whether a stop signal is inputted and whether a limit switch is ON or OFF. Where there is no stop signal and the limit switch is OFF, the program is returned to step S13, thereby repeating steps S13, S14, S15 and S16. When the stop signal is detected or the limit switch is ON, at step S20 the speed of the servo-system is instructed to be $0_{r.p.m.}$. After that, at steps S21 and S22, the servo-program is opened every 5 ms. Then at step S23, a check is made as to whether a power source is OFF or ON.

As above described, by adding an open instruction, a close instruction and a pause instruction to such languages as BASIC and FORTRAN, a sequence control and a servo-control can be made readily. A computer system for introducing these parallel processing instructions will be described with reference to a block diagram shown in FIG. 7.

The central processing unit (CPU) 2 is connected to a program counter 3 and a program memory device 4. The program counter 3 designates an address of the program memory device 4 which stores a program to be executed next, and the CPU 2 processes an address of the program memory device designated by the content of the program counter 3, the content thereof being renewed in accordance with the type of the instruction executed. More particularly, in the case of a conventional instruction, the program counter operates in the same manner as that of a general purpose computer. For an open instruction, the content of the program counter is renewed to an address of an instruction following an open instruction. To terminate a program containing an executed close instruction the content is renewed to an address selected from an address table 5. In other cases the content is renewed to the address of an instruction following the close instruction. In the case of a pause instruction, the content is also renewed to an address selected from address table 5.

The program memory device 4 stores programs of a sequence control, servo-control or the like to be executed, and the address table 5 stores addresses of programs designated by an open instruction and a pause instruction. More particularly, (1) in the case of the open instruction, the address of a program designated by an argument is written into an idle or vacant portion of the table found by scanning the same. The vacant portion of the table is designated by a pointer 6 utilized at the time of scanning. (2) In the case of a pause instruction, the address of an instruction following the pause instruction is written or registered in the address table. The addresses thus written are searched and erased by a close instruction. (3) In the case of a close instruction the address of a program designated by an argument is found and erased as a result of scanning. The registered addresses are erased after being referred to by a close instruction or pause instruction. (4) In the case of the close instruction, after executing the processing of (3), whereas in the case of the pause instruction, after executing the processing of (2), the contents of the time table 7 designated by pointer 6 as a result of scanning are transferred to the program counter 3 by the CPU, and the contents of the address table designated by the pointer 6 are erased.

A timer 1 is connected to CPU 2 and constituted by a counter renewed by a definite count at each definite interval. The contents of the counter are readable by CPU 2, and the read out content corresponds to the count at the time of reading.

The pointer 6 is utilized at the time of scanning the address table 5 and time table 7, the tables 5 and 7 corresponding to each other in one to one relation. Accordingly, the pointer 6 is used in common for both tables and designates corresponding portions of both tables. Further, the pointer 6 is used for writing and reading both tables.

The time table 7 is written with a predetermined time at which the execution of a program registered in the address table starts. The written position is designated by pointer 6 and corresponds to the portion of the address table at which a program is registered. More particularly, (1) in the case of an open instruction, the count of timer 1 corresponds to a predetermined time at which the execution starts. (2) In the case of a pause instruction, the sum of the timer time and a pause time designated by the argument of a pause instruction becomes the predetermined time at which the execution starts.

A method of executing a conventional instruction, an open instruction, a close instruction and a pause instruction according to this invention by using the computer system shown in FIG. 7 will be described as follows.

In the initial state, a sequence control or a servo-control or the like to be executed is stored in the program memory device 4 while the program counter 3 holds an execution initiation address of the program. The timer 1 is reset by a signal "0". Address table 5 and time table 7 are vacant, whereas pointer 6 is set to point to the leading or top addresses of the address table 5 and time table 7. The CPU 2 repeats the operation of taking and executing an instruction at an address held in the program counter. When the written instruction is a conventional instruction other than the open instruction, the close instruction or the pause instruction, the instruction is executed in the same manner as in a conventional computer to renew the content of the program counter 3. When the written instruction is an open instruction, however, the time table 7 is first scanned by pointer 6 to find a vacant portion of the address. Then the value of timer 1 is written into the vacant portion of the time table 7 by CPU 2, and the initial or leading address of the program to be opened is written into the same position as that of the address table 5. After that, the content of the program counter 3 is used to renew the address of an instruction following the open instruction for commencing the execution of the next instruction.

Where the written instruction is a close instruction that terminates a program containing the same, the value of timer 1 is written into CPU 2, and the pointer 6 scans the time table 7 for a value smaller than the value of timer 1 stored in CPU 2. In the absence of such a value, the value of the timer is written again for repeating the same operation. Upon registration of a value smaller than the value of timer 1, the content of the address table 5 shown by pointer 6 is transferred to program counter 3 so as to erase the contents of time table 7 and address table 5 pointed at by pointer 6, whereby the execution of an instruction shown by the content of the program counter 3 is initiated. In this manner, the original program is terminated and the other program is started.

Where an instruction written is a close instruction other than that described above, the pointer 6 scans the address table 5 for erasing a program to be closed as well as the content of the time table 7 at the same position, thereby terminating a program to be terminated by the close instruction.

Where a written instruction is a pause instruction, pointer 6 scans the time table 7 for finding a vacant portion thereof. The CPU 2 takes in the value of timer 1 and adds the value to a pause a time and the sum is written into the vacant portion of the time table 7. Also, the address of an instruction succeeding the pause instruction is written in the same position of the address table 5. The execution of the program may be paused by the operation described above, and another program that can be executed during the pause is searched. Thus, the CPU 2 takes in the value of timer 1 and the time table 7 is scanned by the pointer 6 for a value smaller than that of timer 1. If such value is absent, the value of timer 1 is read again for repeating the same operation. If a value smaller than that of timer 1 has been registered, the content of the address table 5 denoted by pointer 6 is transferred to program counter 3, and the contents of time table 7 and address table 5 denoted by pointer 6 are erased so that execution of an instruction shown by the count of the program counter is commenced. In this manner, the original program is paused and the other programs are executed. In this manner, the computer system described above can execute not only a conventional instruction but also an open instruction, a close instruction and a pause instruction.

Figure 8:
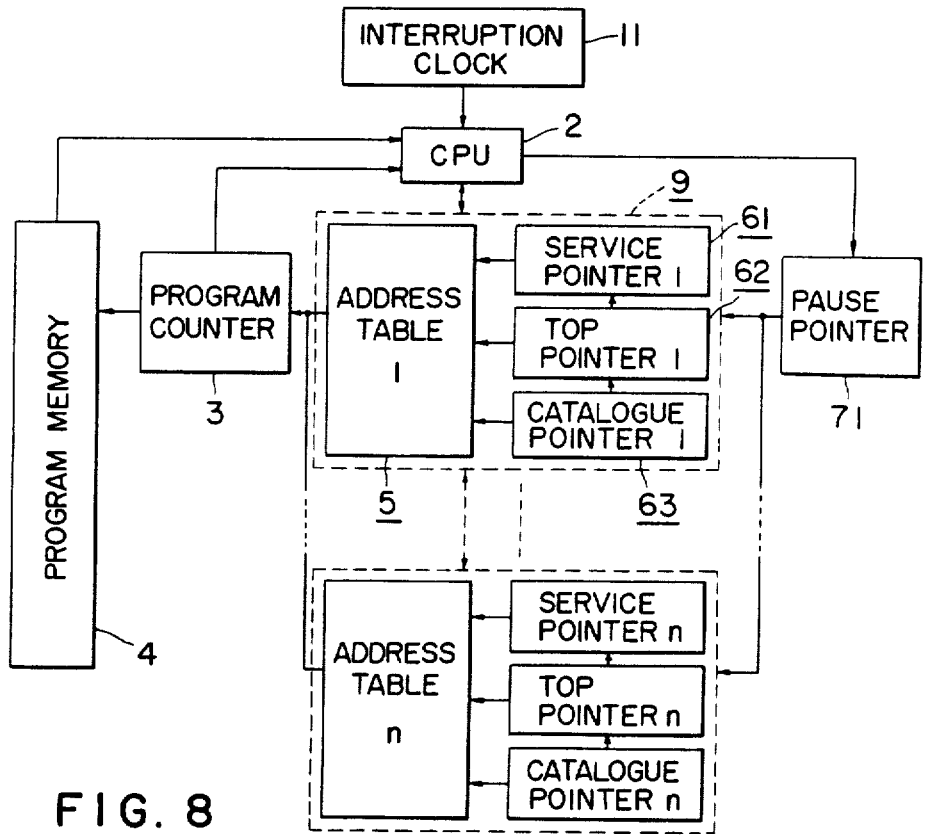
FIG. 8 is a block diagram showing a modified embodiment of this invention.

As above described, the open instruction, the close instruction and the pause instruction can be executed based on the value of timer 1. Similar operation can be efficiently made by providing a plurality of service circuits 9 for respective pause instructions as shown in FIG. 8.

As shown, CPU 2 is connected to program counter 3 and program memory device 4, and an instruction of an address stored in the program counter connected to the program memory device 4 is read out and supplied to CPU 2 to be executed thereby. An interruption clock 11 is connected to CPU 2 for applying an interruption to CPU 2 at a definite time interval. Further, CPU 2 is connected to a plurality of service circuits 9 and to a pause pointer 71 which selects one of the service circuits 9. Each service circuit 9 includes an address table 5, a service pointer 61, a top pointer 62 and a catalogue pointer 63, the outputs of these pointers being supplied to an address table as shown in FIG. 8. The service circuits are selected by a pause pointer 71 corresponding to a pause time. The interrupt clock 11 applies an interruption to CPU 2 at a definite interval. The CPU 2 determines a time at which the interruption is applied and renews the pause pointer 71 such that one of the service circuits 9 is selected corresponding to the time thus determined.

The purpose of the service pointer 61 is to show the position of the address table 5 storing the address of a program now being served. In the initial state, the service pointer 61 shows the leading position of the address table 5. Upon completion of a program now being served by a close instruction or a pause instruction the service pointer is renewed to the next position. When the renewed content coincides with the content of the top pointer 62, the program would not be executed, whereas the content of the service pointer 61 is renewed.

The purpose of the top pointer 62 is to show the position of the address table 5 in which the leading address of a program is to be served. Thus, in the initial state, the top pointer 62 shows the leading position of the address table. When a service circuit 9 including a top pointer 62 is selected, the content thereof is transferred to service pointer 61.

The purpose of the catalogue pointer 63 is to show the position of address table 5 to be written with an instruction in accordance with an open instruction and a pause instruction. Thus in the initial state, the catalogue pointer 63 shows the leading position of the address table 5. Upon execution of an open instruction, the position of the address table is renewed to the next position. When a service circuit 9 containing the catalogue pointer 63 is selected, the content thereof is transferred to top pointer 62.

The purpose of the pause pointer 71 is to select one of the service circuits 9. Thus, in the initial state, it selects a service circuit 9 having the shortest pause time. When an interruption is applied by interruption clock 11 or when the contents of the service pointer 61 and the top pointer 62 coincide with each other, the pause pointer 71 is renewed. Although there are many methods of renewal, the following method is preferred. More particularly, when an interruption is applied, the content of the pause pointer 71 is renewed to select a service circuit 9 having the shortest pause time. When the contents of service pointer 61 and top pointer 62 coincide with each other, a service circuit corresponding to a pause time of a length next to that of the pause time of a service circuit 9 which has been selected would be selected.

A method of executing a conventional instruction, an open instruction, a close instruction, and a pause instruction of this invention by utilizing the computer system shown in FIG. 8 is as follows.

After starting the CPU 2, pause pointer 71 selects one of the service circuits 9 corresponding to a pause time. Pause pointer 71 is set by CPU 2 such that the service circuits 9 are selected corresponding to predetermined pause times which are measured by interruption clock pulses generated by interruption clock 11. The content of top pointer 62 of the selected service circuit 9 is transferred to a service pointer 61, whereas the content of a catalogue pointer 63 is transferred to top pointer 62. An address in the address table 5 designated by service pointer 61 is transferred to program counter 3 so that an instruction stored in program memory device 4 designated by program counter 3 is executed by CPU 2. Thereafter, in the same manner as in a conventional computer, the content of program counter 3 is renewed in accordance with an executed instruction, thereby continuing the service operation.

The operation of executing an open instruction is as follows. A starting address of a program to be opened is registered in address table 5 designated by catalogue pointer 63 of a service circuit 9 designated by an added argument, and the content of the catalogue pointer 63 is renewed to show the next position of the address table 5. The contents of the service pointer 61 and catalogue pointer 63 are renewed to show the head portion of address table 5 when the last portion thereof is reached.

After execution of a close instruction, the address table 5 of a service circuit 9 designated by an added argument is scanned for erasing a program to be closed. After executing a pause instruction, on the other hand the next address of the pause instruction is registered on the address table 5 designated by catalogue pointer 63 of a service circuit 9 designated by an added argument. The content of the service pointer 61 of a service circuit 9 selected by pause pointer 71 is renewed to show the next position of the address table 5 for comparing with each other the contents of service pointer 61 and top pointer 62. When the compared contents do not coincide with each other, the program is branched to the operation to be executed after starting the operation of the CPU 2. Upon coincidence, the program is branched to the starting operation described above, whereby CPU 2 renews the pause pointer 71.

As above described, not only a conventional instruction but also an open instruction, a close instruction and a pause instruction can be executed by a computer system shown in FIG. 8.

Figure 7:
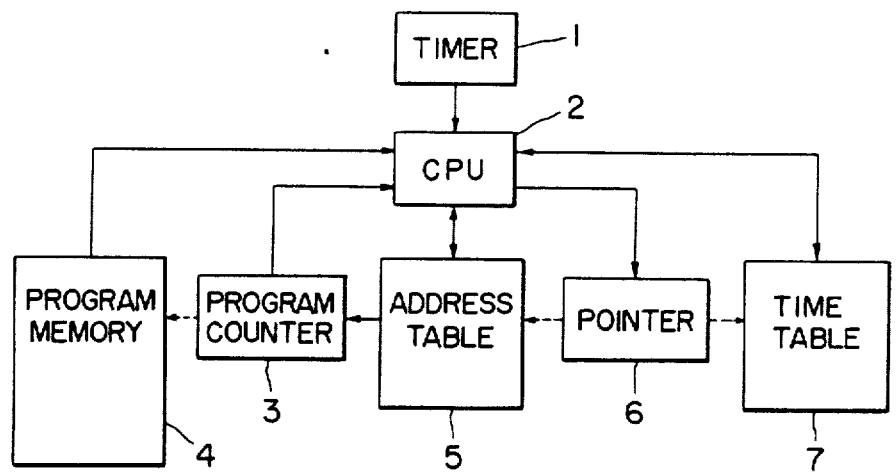
FIG. 7 is a block diagram showing a computer system embodying the invention.

Although in the embodiment shown in FIG. 7 the system is constituted by hardware including address table 5, pointer 6 and time table 7, such system can also be realized with a general purpose computer added with a timer 1 (see FIG. 7) and suitable software.

As above described, according to this invention, a sequence control and a servo-control can be readily performed with languages such as BASIC and FORTRAN, which are different from system languages. In addition, since the number of flags and timers can be greatly reduced, the programs become simple and clear. Where a high speed operation and a special calculation are required, such system languages as ASSEMBLER can be used at the same time. By realizing the invention a using a hardware having a time table and an address table, an efficient control can be made.

What is claimed is:

1. A computer system for executing three types of parallel processing instructions including an open instruction, a close instruction and a pause instruction, said computer system comprising:
    a central processing unit (CPU);
    a timer comprising a counter renewed by a definite count at predetermined definite intervals and connected to said CPU to be read thereby;
    program memory means for storing programs of a sequence control and a servo-control to be executed by said CPU;
    a program counter connected to said CPU and said program memory means for designating an address of said program memory means, at which address an instruction to be executed next is stored, and a content of said program counter being renewed according to a type of instruction executed by said CPU;
    an address table connected to said CPU and said program counter for registering addresses of programs designated by an open instruction and a pause instruction, registered addresses of said address table being searched and erased in accordance with a close instruction;
    a time table connected to said CPU and written with a predetermined time from said timer for starting an execution of a program registered in said address table; and
    a pointer connected between said address table and said time table and to said CPU for scanning corresponding portions of said address table and said time table.

2. The computer control system according to claim 1, wherein the content of said program counter is renewed to an address of an instruction succeeding an open instruction, or to an address selected from said address table when a program containing an executed close instruction is terminated, or to an address of an instruction succeeding a close instruction or to an address selected by said address table in accordance with a pause instruction.

3. The computer control system according to claim 1, wherein in the case of said open instruction said address table is registered with an address of a program designated by an argument in a vacant portion of said address table found as a result of scanning of said address table by said pointer.

4. The computer system according to claim 1, wherein in the case of said pause instruction said address table is registered with an address of an instruction succeeding said pause instruction.

5. The computer system according to claim 1, wherein an address of a program designated by an argument and registered in said address table is written into an idle portion of said address table and erased as a result of scanning said address table by said pointer, in the case of said close instruction.

6. The computer system according to claim 1, wherein addresses registered in said address table are searched by said pointer and erased by a close instruction.

7. The computer system according to claim 1, wherein contents of said time table at positions designated by said pointer are transferred to said program counter under control of said CPU after executing said close or pause instruction, said CPU controlling said time table in accordance with an instruction read out from said program memory means.

8. The computer system according to claim 1, wherein said pointer is also used to read from and write into said address table and said time table.

9. The computer system according to claim 1, wherein said predetermined time corresponds to a count of said counter at the time of an open instruction or a sum of said count and a pause time designated by an argument of a pause instruction at the time of a pause instruction.

10. A computer system for effecting a sequence control and a servo-control, comprising:
    a central processing unit (CPU);
    an interruption clock which applies an interruption signal to said CPU at a predetermined interval;
    program memory means for storing programs of a sequence control and a servo-control to be executed by said CPU;
    a program counter connected to said CPU and said program memory means for designating an address of said program memory means, at which an instruction to be executed next is stored, and a content of said program counter being renewed according to a type of an instruction executed by said CPU;
    a plurality of service circuits connected to said CPU and said program counter, each service circuit including an address table connected to said program counter, a service pointer, a top pointer and a catalogue pointer, said pointers being connected to said address table; and
    a pause pointer controlled by said CPU for selecting one of said service circuits having a shortest pause time at an initial state,
    said address table being connected to said program counter for registering addresses of programs designated by an open instruction and a pause instruction, addresses registered in said address table and designated by said service pointer being transferred to said program counter;
    said service pointer designating a position of said address table storing an address of a program now being served;

said top pointer denoting a leading address of a program to be served and stored in said address table; and said catalogue pointer denoting a position of said address table written by an open instruction and a pause instruction.

11. The computer system according to claim 10, wherein said CPU determines a time at which said interruption signal is applied so as to renew said pause pointer such that the same selects one of said service circuits in accordance with a pause time.

12. The computer system according to claim 10, wherein a content of said service pointer is renewed to a next position upon completion of programs now being served by a close instruction and a pause instruction.

13. The computer system according to claim 12, wherein when a renewed content of said service pointer coincides with a content of said top pointer, no program is executed and the content of said service pointer is renewed.

14. The computer system according to claim 10, wherein the service circuit containing a given top pointer is selected by said pause pointer, and a content of said top pointer is transferred to said service pointer.

15. The computer system according to claim 10, wherein the service circuit containing a given catalogue pointer is selected by said pause counter, and a content of said catalogue pointer is transferred to said top pointer.

16. The computer system according to claim 10, wherein said pause pointer is renewed when said interruption signal is applied to said CPU or when contents of said service pointer and said top pointer coincide with each other.

* * * * *